(12) United States Patent
Wai

(10) Patent No.: US 6,225,603 B1
(45) Date of Patent: May 1, 2001

(54) ELECTRIC OVEN

(75) Inventor: Darren Murray Wai, Tai Po (HK)

(73) Assignee: Electrinic Enterprise Ltd., Tai Po (HK)

( * ) Notice: Subject to any disclaimer, the term of this patent is extended or adjusted under 35 U.S.C. 154(b) by 0 days.

(21) Appl. No.: 09/444,411

(22) Filed: Nov. 22, 1999

(51) Int. Cl.[7] .............................. A21B 1/02; A21B 1/14; A21B 3/00; F27D 1/10; F27B 3/14
(52) U.S. Cl. ..................... 219/391; 219/403; 126/19 R
(58) Field of Search ................................. 219/391, 392, 219/400, 403; 126/19 R, 22, 39 M; 99/392, 399

(56) References Cited

U.S. PATENT DOCUMENTS

| | | | |
|---|---|---|---|
| 3,036,192 | * 5/1962 | Fry | 219/391 |
| 3,120,224 | * 2/1964 | Divelbiss | 126/39 M |
| 3,151,608 | * 10/1964 | Hurko | 126/19 R |
| 3,153,408 | * 10/1964 | Brillas | 126/39 M |
| 3,159,156 | * 12/1964 | Incledon | 126/19 R |
| 3,192,917 | * 7/1965 | Baert | 126/19 R |
| 3,207,148 | * 9/1965 | Marinace | 126/19 R |
| 3,410,260 | * 11/1968 | Morgan | 126/19 R |
| 3,425,405 | * 2/1969 | Dills | 126/19 R |
| 3,536,056 | * 12/1970 | Dills | 126/19 R |
| 3,706,302 | * 12/1972 | Helgeson et al. | 126/19 R |
| 4,307,285 | 12/1981 | DeRemer . | |
| 5,142,125 | * 8/1992 | Fioroli et al. | 219/400 |
| 5,878,738 | * 3/1999 | Poirier | 126/19 R |

FOREIGN PATENT DOCUMENTS 2 104 211   3/1983  (GB) .

* cited by examiner

Primary Examiner—Joseph Pelham
(74) Attorney, Agent, or Firm—Leydig, Voit & Mayer, Ltd.

(57) ABSTRACT

An electric oven having an open fronted self-supporting removable box-like liner that can be completely removed for cleaning. The liner has a slot to receive a heating element mounted inside the oven at a rear wall. When the liner is inserted or removed, the heating element slides through the slot without being electrically disconnected. The front end of the heater is supported by a dome integral with a base of the liner. The liner covers or obscures the whole of the inside of the oven so that no cleaning of the oven surface is required. The liner may be removed for washing in a dishwasher.

6 Claims, 3 Drawing Sheets

ELECTRIC OVEN

BACKGROUND OF THE INVENTION

1. Field of the Invention

The invention relates to electric ovens.

2. Description of Prior Art

The invention relates more particularly to electric ovens with removable liners. It is known to provide removable liners that are supported in place inside an oven chamber and removed for cleaning (see for example U.S. Pat. No. 4,307,285 and UK Patent No. 2,104,211). In the prior art arrangements, various parts of the oven are not covered by the liners and must be cleaned once the liners are removed. This cleaning is especially difficult in the region around the electric heating element or elements, and in crevices and corners deep inside the oven chamber.

SUMMARY OF THE INVENTION

It is an object of the invention to overcome or to reduce this problem.

According to one aspect of the invention, there is provided an electric oven comprising a box-like chamber having an open first side and a second side opposite to the first side, a heating element supported in a plane at the second side of and extending across the chamber, an open sided self-supporting removable box-like liner which slides through the first side into and fits inside the chamber, the liner having an aperture in an opposite side thereof to receive the heating element such that the liner can be inserted into the chamber for use and completely removed for cleaning.

It is preferred that at least one of other sides of the liner guides to support a removable shelving platform.

The electric oven may include an opening in a side of the liner to allow air to circulate around the inside of the liner from an electric fan mounted in the corresponding side of the chamber.

Preferably, at least inner surfaces of the liner are at least partially covered by non-stick material.

Preferably, at least inner surfaces of the liner are at least partially covered by self-cleaning material.

In a preferred embodiment, the first and second sides of the chamber are its respective front and rear sides.

According to another aspect of the invention, there is provided an open sided self-supporting removable box-like liner for use in an electric oven, having an aperture in a side opposite to the open side through which a planar heating element in the oven can pass and extend in use across a heating chamber formed by the liner.

It is preferred that at least one of other sides of the liner includes guides to support a removable shelving platform.

The liner may include a support element provided within the liner to support a region of the heating element in its operative position in use.

BRIEF DESCRIPTION OF DRAWINGS

An electric oven and removable liner according to the invention will now be described by way of example with reference to the accompanying drawings in which.

DETAILED DESCRIPTION OF PREFERRED EMBODIMENTS

Figure 1:
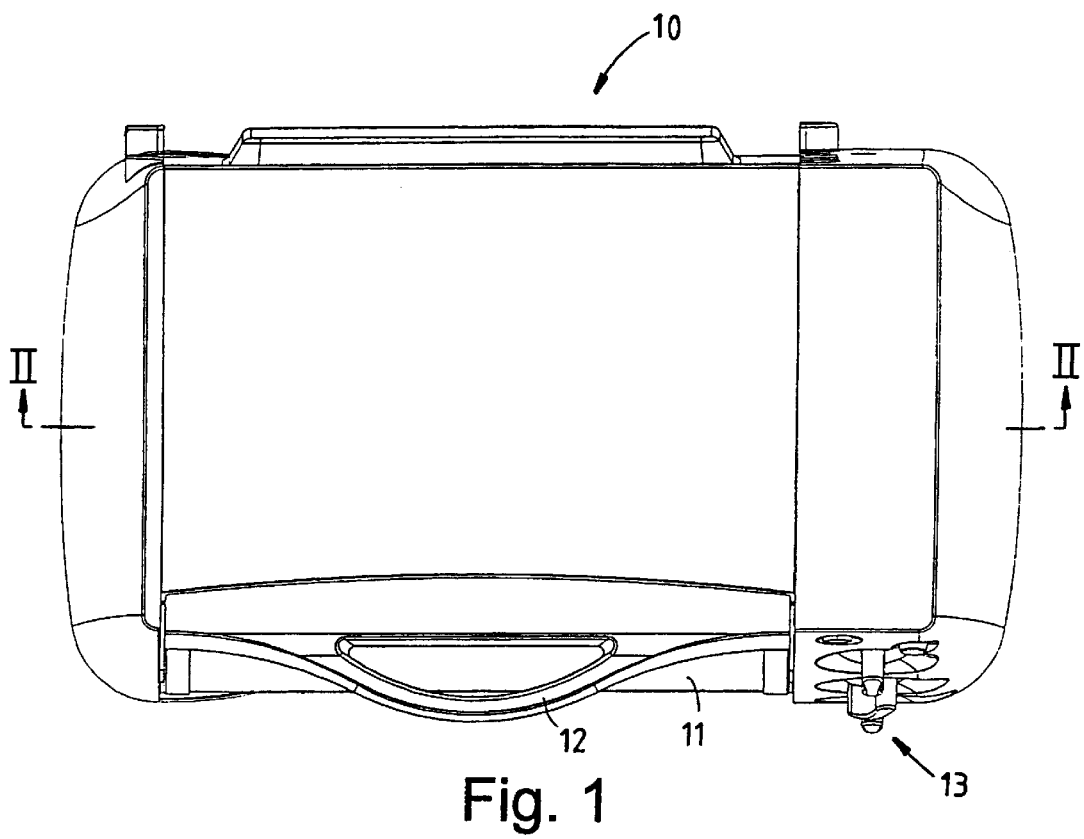
FIG. 1 is a top view of the oven.

Referring to the drawings, in FIG. 1 the oven 10 has a bottom hinged door 11 with a handle 12 and manual control dials 13. The oven 10 has two W-shaped (or designed in any other shape or form) electric heating elements 14 and 15 (see FIG. 2) that are supported at the rear of an open fronted box-like chamber 16 and extend generally horizontally therefrom. An open fronted self-supporting removable box-like liner 17 fits slidably into the chamber 16 and rests on a base 18 of the chamber 16. Resilient guide rails 19 bear against an outer top surface of the liner 17 to hold the liner 17 firmly in position.

The liner 17 includes two elongate slots 20 and 21 in its rear wall to receive the heating elements 14 and 15 respectively and allow the liner 17 to slide into and out of the chamber 16 as required. The rear wall may also be provided with an opening or slatted vent 22 (shown dotted in FIG. 2) to allow air from a circulating fan (not shown) mounted in the rear of the chamber 16 to be blown into the inside of the liner 17.

The liner 17 has two supporting elements for the heating elements 14 and 15 respectively, namely a dome 23 and a detachable bridge 24. The dome 23 and bridge 24 provide stabilising supports for the remote regions or ends of the heating elements 14 and 15, respectively, to maintain them in their normal horizontal planes inside the liner 17. When the liner 17 is removed, the elements 14 and 15 will remain generally horizontal and do not normally require the stabilising supports as they are unlikely to be subjected to any stress or accidental strain. This may not be the case during normal use when a pan or a shelving platform, say, is momentarily and unintentionally pushed against the heating elements, for example.

Figure 2:
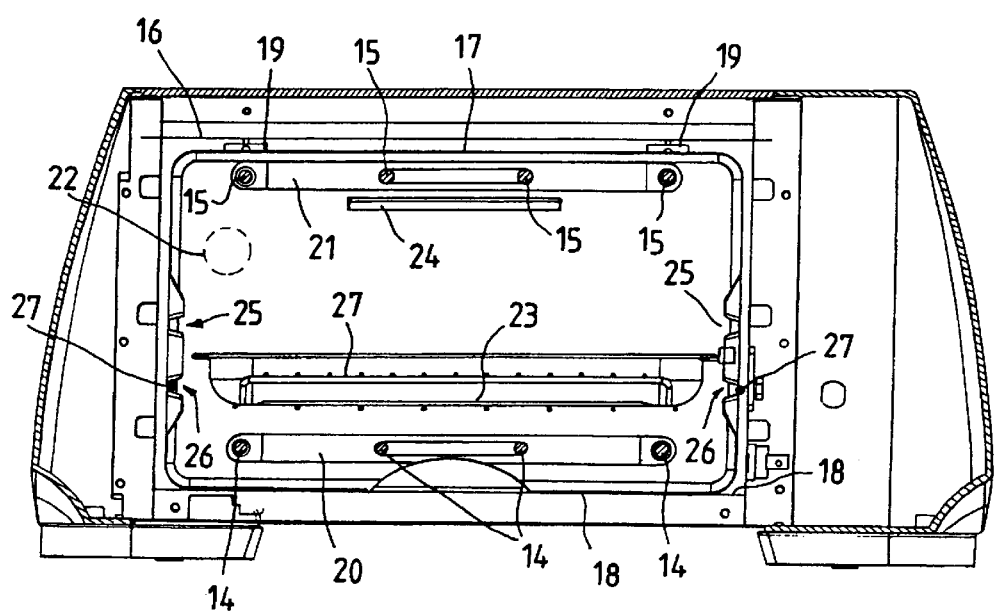
FIG. 2 is a sectional view taken along line II—II of FIG. 1.
Figure 3:
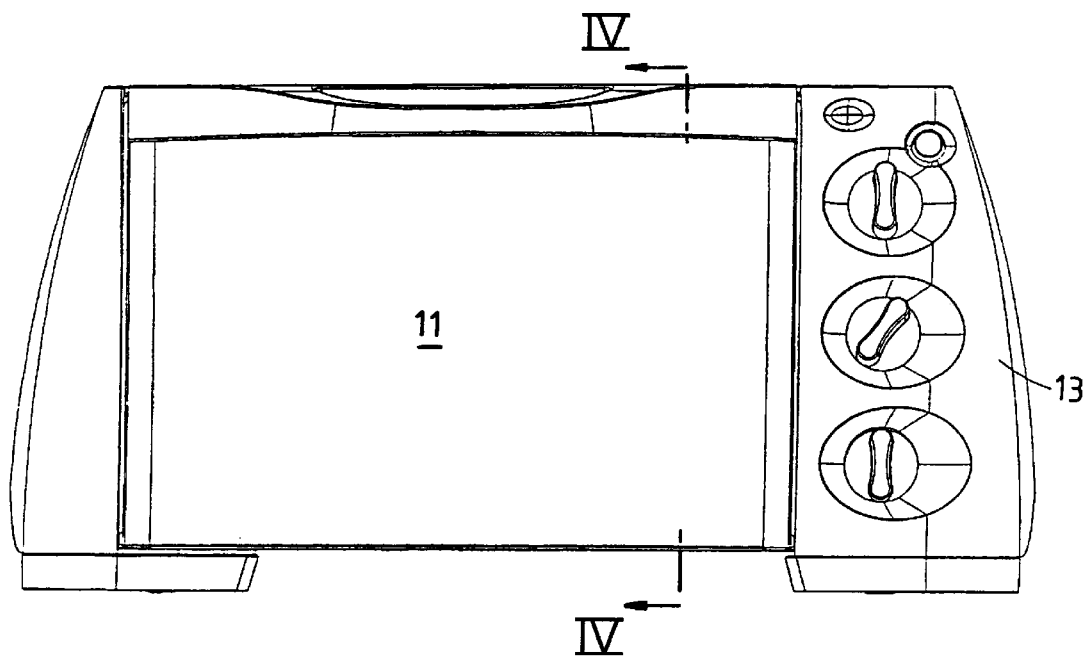
FIG. 3 is a front view of the oven.

Opposite inside surfaces of the liner 17 integrally include two pairs of upper and lower guides or slideways 25 and 26 to receive respective removable shelving platforms. One shelving platform 27 is shown in FIG. 2 and is composed of joined-together wire strands having a conventional structure known and used in present day ovens as shelving platforms.

Figure 4:
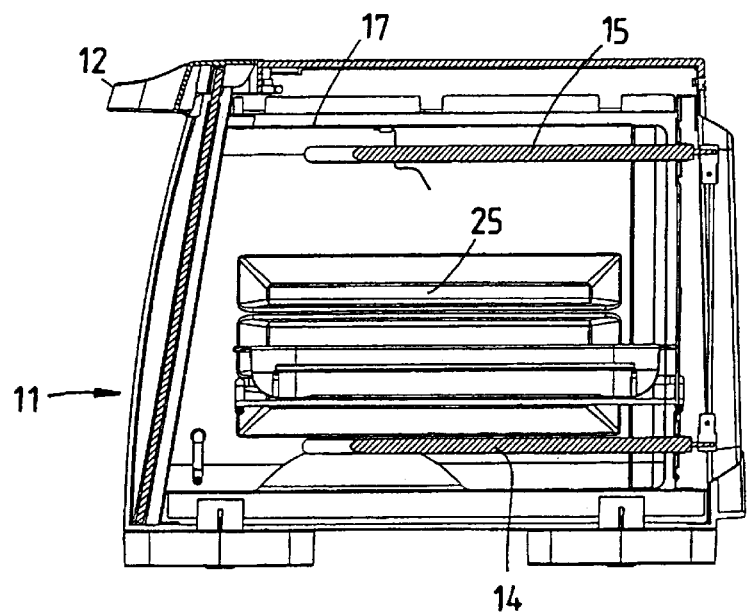
FIG. 4 is a sectional view taken along line IV—IV of FIG. 3.

In FIG. 4, a cross-sectional side view shows the configuration of the oven 10 and the liner 17 with the heating elements 14 and 15.

Figure 5:
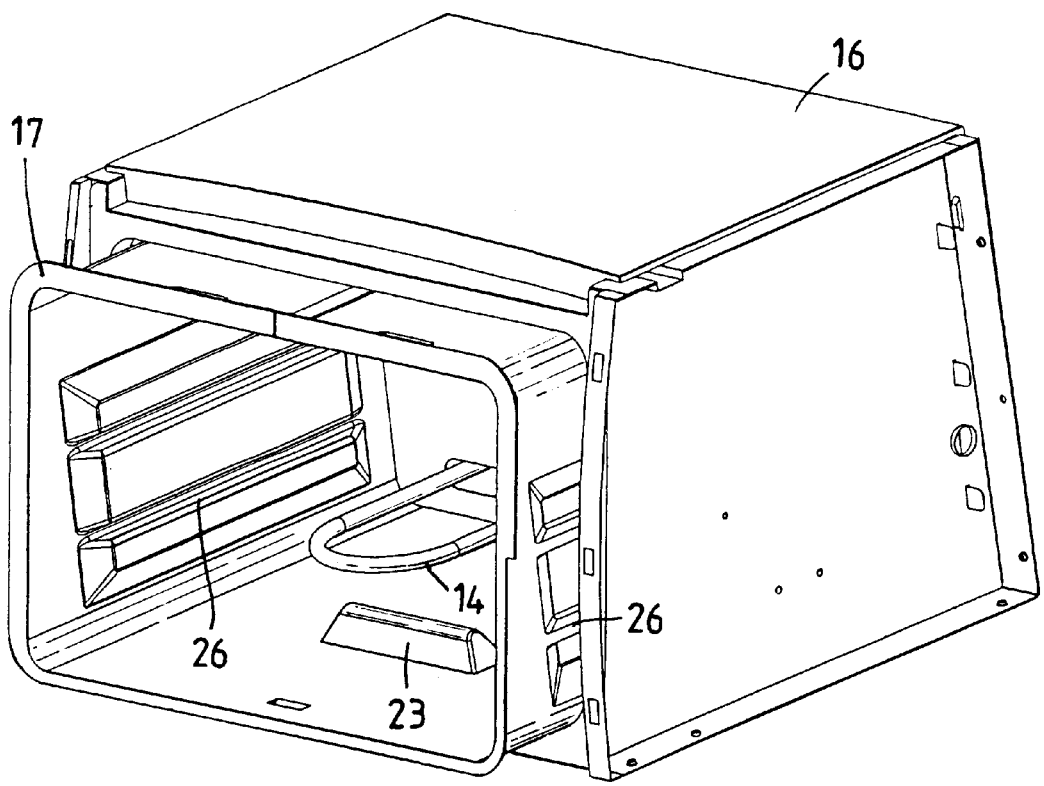
FIG. 5 is an isometric view of an inner chamber of the oven with the liner partially removed.

The liner 17 is partially removed in FIG. 5. It will be appreciated that the liner which is made of suitable planar sheets of material that are formed and shaped as required and fixed together, forms a self-supporting structure that can be completely removed from the oven 10. As such, the liner 17 can be taken to a washing station and, as the liner 17 is totally free of electrical components, be washed in a dishwasher, if preferred.

The liner 17 covers the whole of the inside of the chamber 16 in use and therefore the chamber 16 itself normally requires no cleaning. This contrasts with removable liners in current use that, broadly stated, do not completely protect the inside surfaces of the oven from cooking contamination and so require cleaning once those liners are removed.

The rear of the slots 20 and 21 are designed to fit snugly against a surface provided in the chamber 16 when the liner 17 is fully inserted into the chamber 16 so that little or no hot air escapes into the chamber 16 behind the liner 17.

The liner 17 is preferably at least partially coated, on its inner and/or outer surfaces, with non-stick or self-cleaning materials. The liner 17 may also include integrally formed handles or finger grips, to aid the insertion and removal of the liner 17 into and from the chamber 16, if desired.

It is envisaged that the oven 10 may have another or a different side that is open, such as the top side, through which the liner 17 is slidable into or out of the oven 10.

It is also envisaged that the heating elements 14 and 15 may be provided to extend from another side of the chamber 16, such as the left and/or right side. In that case, although slots equivalent to the aforesaid slots 20 and 21 should be formed on the left and/or right side of the liner 17, suitable apertures should also be formed on the (rear) side of the liner 17 opposite to the open (front) side for accommodating the heating elements. The heating elements 14 and 15 may be vertical instead of horizontal.

The slideways 25 and 26 may be formed on the top side (instead of the left and right sides as described) of the liner 17, for supporting a generally U-shaped removable shelving platform.

The invention has been given by way of example only, and various other modifications of and/or alterations to the described embodiment may be made by persons skilled in the art without departing from the scope of the invention as specified in the appended claims.

I claim:

1. An electric oven comprising:

a box-like chamber having an open first side and a second side opposite to the first side, a heating element supported in a plane at the second side of and extending across the chamber, and an open sided self-supporting removable box-like liner which slides through the first side into and fits inside the chamber, the liner having an aperture in a side to receive the heating element so that the liner can be inserted into the chamber for use and completely removed for cleaning without disconnecting the heating element from the oven.

2. The electric oven according to claim 1, in which at least one side of the liner includes guides to support a removable shelving platform.

3. The electric oven according to claim 1, in which at least inner surfaces of the liner are at least partially covered by non-stick material.

4. An open sided self-supporting removable box-like liner for use in an electric oven, the liner having an aperture in a side opposite to an open side and through which a substantially planar heating element in the oven can freely pass without disconnection from the oven and extend, in use, across a heating chamber formed by the liner.

5. The liner according to claim 4, in which at least one side of the liner includes guides to support a removable shelving platform.

6. The liner according to claim 4, including a support element within the liner to support a region of the heating element when the oven is in use.

* * * * *

UNITED STATES PATENT AND TRADEMARK OFFICE
CERTIFICATE OF CORRECTION

PATENT NO. : 6,225,603 B1
DATED : May 1, 2001
INVENTOR(S) : Darren Murray Wai

It is certified that error appears in the above-identified patent and that said Letters Patent is hereby corrected as shown below:

<u>Title page,</u>
Item [73], should read:
-- [73] Assignee: Eltrinic Enterprise Ltd., Tai Po
                    (HK) --

Signed and Sealed this

Twenty-second Day of July, 2003

JAMES E. ROGAN
*Director of the United States Patent and Trademark Office*